US012385628B1

(12) United States Patent
Xiao

(10) Patent No.: US 12,385,628 B1
(45) Date of Patent: Aug. 12, 2025

(54) WINE BOTTLE LAMP

(71) Applicant: SHENZHEN FEIHE ELECTRONICS CO., LTD, Shenzhen (CN)

(72) Inventor: Gang Xiao, Shenzhen (CN)

(73) Assignee: SHENZHEN FEIHE ELECTRONICS CO., LTD, Shenzhen (CN)

(*) Notice: Subject to any disclaimer, the term of this patent is extended or adjusted under 35 U.S.C. 154(b) by 0 days.

(21) Appl. No.: 18/826,341

(22) Filed: Sep. 6, 2024

(30) Foreign Application Priority Data

Aug. 2, 2024 (CN) ........................ 202421864664.8

(51) Int. Cl.
*F21V 21/06* (2006.01)
*F21V 23/06* (2006.01)
*F21Y 103/10* (2016.01)
*F21Y 115/10* (2016.01)

(52) U.S. Cl.
CPC .............. *F21V 21/06* (2013.01); *F21V 23/06* (2013.01); *F21Y 2103/10* (2016.08); *F21Y 2115/10* (2016.08)

(58) Field of Classification Search
CPC ...... F21V 21/06; F21V 23/06; F21Y 2103/10; F21Y 2115/10
See application file for complete search history.

(56) References Cited

U.S. PATENT DOCUMENTS 5,178,450 A * 1/1993 Zelensky .................. F21L 2/00 362/186
9,938,059 B1 * 4/2018 Handick ................. F21V 23/04
2010/0214774 A1* 8/2010 Liu ...................... B65D 51/248 362/183
2015/0192260 A1* 7/2015 Muehlemann ..... A47G 23/0309 362/183
2018/0327154 A1* 11/2018 Solan ..................... B65D 51/18

* cited by examiner

*Primary Examiner* — Bao Q Truong
(74) *Attorney, Agent, or Firm* — JEEN IP LAW, LLC

(57) ABSTRACT

A wine bottle lamp is provided, which includes a lampshade, a bottom of the lampshade is connected with a clamping sleeve and an LED light string; the clamping sleeve is of concave cylindrical shape; the LED light string is located inside the clamping sleeve, and a bottom of the LED light string extends out of the clamping sleeve; an inner wall of the clamping sleeve is contacted with an outer wall of a beer bottle mouth. At the same time, the LED light string extends to an interior of the beer bottle. When the LED light string is turned on, light source is emitted from the interior of the beer bottle, thereby integrating the beer bottle with the lamp and enhancing the artistic atmosphere of the wine bottle light.

9 Claims, 6 Drawing Sheets

WINE BOTTLE LAMP

CROSS-REFERENCE TO RELATED APPLICATIONS

This application claims priority to Chinese Patent Application No. 202421864664.8, filed on Aug. 2, 2024, which is hereby incorporated by reference in its entirety.

TECHNICAL FIELD

The present disclosure relates to the field of lamps and lanterns technologies, and in particular, to a wine bottle lamp.

BACKGROUND

Beer is a popular alcoholic beverage that is suitable for various occasions such as family gatherings and company dinners. After drinking beer, empty bottles in hotels will be taken away by servers for recycling. However, at home, a small number of empty bottles are usually left unused due to their low recycling value and cannot be effectively utilized.

In recent years, in the development of lighting fixtures, especially artistic lighting fixtures, the form of installing lighting fixtures on wine bottles, known as wine bottle lights, has emerged to enhance the artistic atmosphere.

However, the current bottle lights on the market only use the bottle as a supporting component to support the lamp. The lamp is located at a top of the bottle, and essentially the bottle only serves as a supporting rod. The light source of the lamp cannot extend to an inside of the bottle, which leads to the bottle and the lamp being unable to be easily integrated, thereby reducing the artistic atmosphere of the bottle light.

SUMMARY

A purpose of the present disclosure is to solve the problem in the prior art that the light source of the lamp cannot extend to the inside of the wine bottle, and to propose a wine bottle lamp.

In order to achieve the above objectives, the present disclosure adopts the following technical solution.

A wine bottle lamp, including a lampshade, where a bottom of the lampshade is connected with a clamping sleeve and an LED light string; the clamping sleeve is of concave cylindrical shape; the LED light string is located inside the clamping sleeve, and a bottom of the LED light string extends out of the clamping sleeve.

In some embodiments of the present disclosure, the clamping sleeve is connected with a male connector inside; where the wine bottle lamp further includes a complementary body, a top of the complementary body is fixedly connected with a female connector, and the LED light string is fixedly connected with the complementary body; a top of the LED light string is electrically connected to the female connector, and the bottom of the LED light string extends into the complementary body.

In some embodiments of the present disclosure, the wine bottle lamp further includes a connection cylinder, which is inserted into the clamping sleeve, and the connector is fixedly connected to the connection cylinder.

In some embodiments of the present disclosure, there are a plurality sets of second protruding strips distributed around an outer wall circumference of the complementary body.

In some embodiments of the present disclosure, there are a plurality sets of first protruding strips distributed around an inner wall circumference of the clamping sleeve.

In some embodiments of the present disclosure, the lampshade is fixedly connected with a luminous plate, and a bottom of the lampshade is fixedly connected with a transparent plate.

In some embodiments of the present disclosure, a battery is fixedly connected an interior of the lampshade.

In some embodiments of the present disclosure, the lampshade is fixedly connected to a circuit board, and a top of the male connector is electrically connected to the circuit board through a wire.

In some embodiments of the present disclosure, a charging interface is provided on the transparent plate.

In some embodiments of the present disclosure, a pressing plate is fixedly connected to a top of the lampshade, and a spring is provided at a bottom of the pressing plate.

Compared with the existing technology, the present disclosure provides a wine bottle lamp, which has the following beneficial effects.

1. The inner wall of the clamping sleeve of the wine bottle lamp is in contact with the outer wall of the beer bottle mouth. And the LED light string extends to an interior of the beer bottle. When the LED light string is lit, the light source is emitted from the interior of the beer bottle, thereby integrating the beer bottle with the lamp and enhancing the artistic atmosphere of the bottle lamp.

2. The bottle lamp, with its clamping sleeve attached to the outer wall of the beer bottle mouth, also synchronously adheres to the interior of the beer bottle mouth, therefore increasing friction and enhancing the stability of the connection with the beer bottle.

3. The wine bottle light not only illuminates the LED light string, but also simultaneously lights up the luminous plate. The emitted light passes through the transparent plate and shines on the outer wall of the beer bottle. Thus, it is more artistic.

Numeral reference: 1—lampshade; 101—transparent plate; 2—luminous plate; 201—LED bead; 3—circuit board; 301—battery; 302—charging interface; 4—clamping sleeve; 401—first protruding strip; 402—connection cylinder; 403—nut; 5—male connector; 501—wire; 6—complementary body; 601—female connector; 602—LED light string; 603—second protruding strip; 7—pressing plate; 701—spring; 8—wine bottle body.

DESCRIPTION OF EMBODIMENTS

The following will provide a clear and complete description of the technical solution in the embodiments of the present disclosure, based on the accompanying drawings. Obviously, the described embodiments are only a part of the embodiments of the present disclosure, not all of them.

In the description of the present disclosure, it should be understood that terms "up", "down", "front", "rear", "left", "right", "top", "bottom", "inside", "outside" and other directional or positional relationships indicated are based on the directional or positional relationships shown in the accompanying drawings, only for a convenience of describing the present disclosure and simplifying the description, and do not indicate or imply that the device or component referred to must have a specific orientation, be constructed and operated in a specific orientation, and therefore cannot be understood as limiting the present disclosure.

Embodiments

Figure 1:
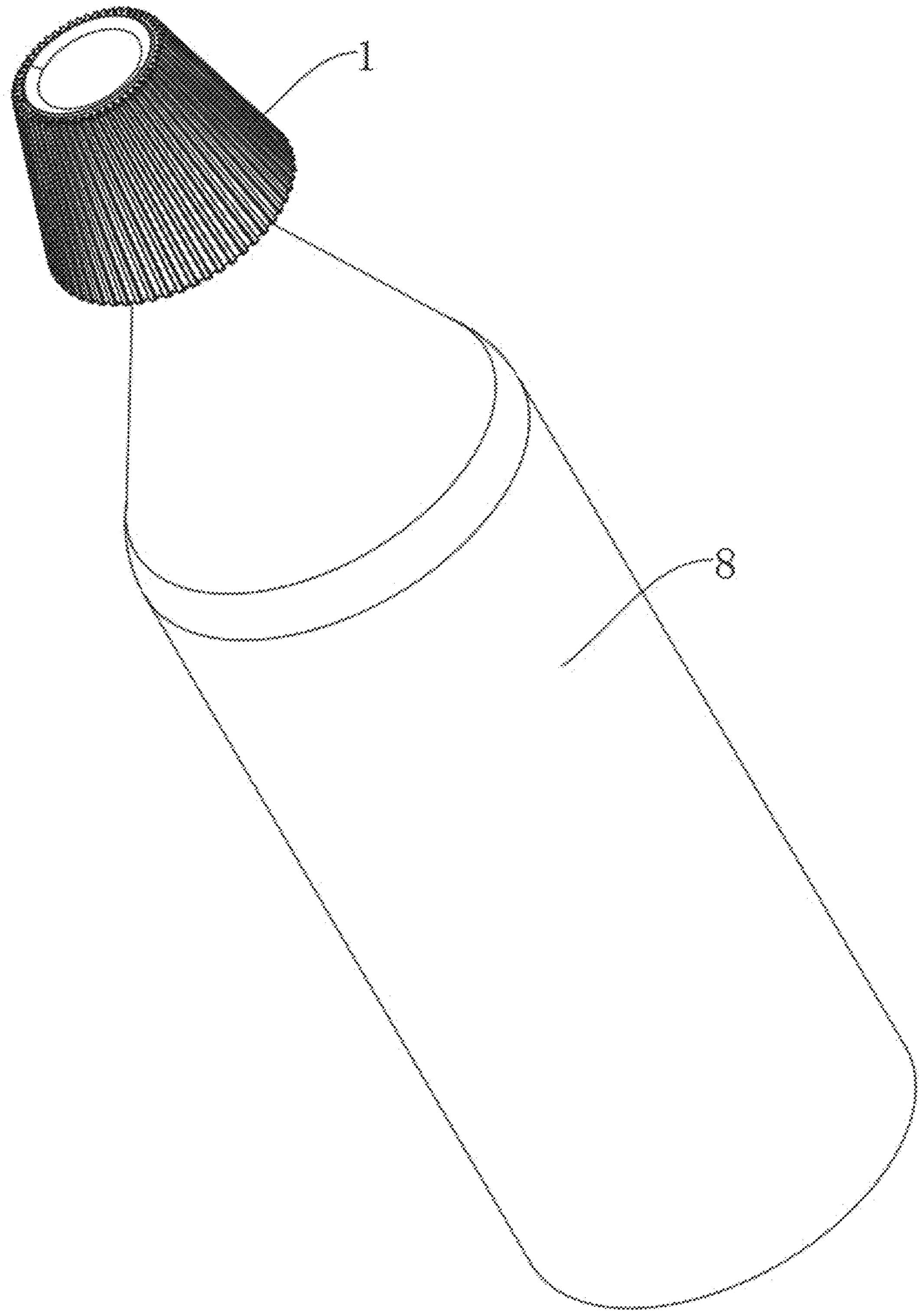
FIG. 1 is a schematic diagram of a usage structure of a wine bottle lamp proposed by the present disclosure.
Figure 2:
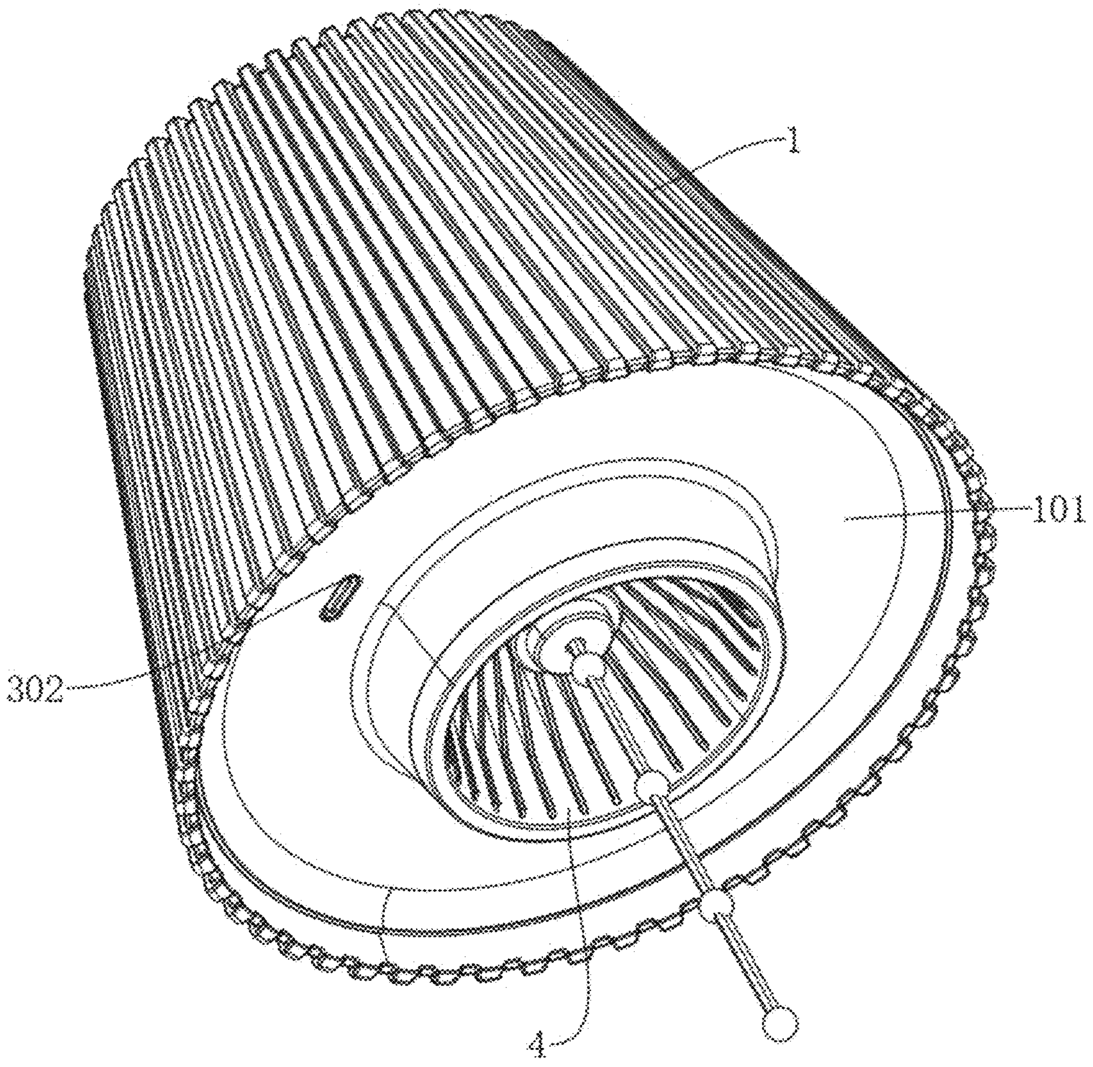
FIG. 2 is a first schematic structural diagram of the wine bottle lamp proposed by the present disclosure.
Figure 3:
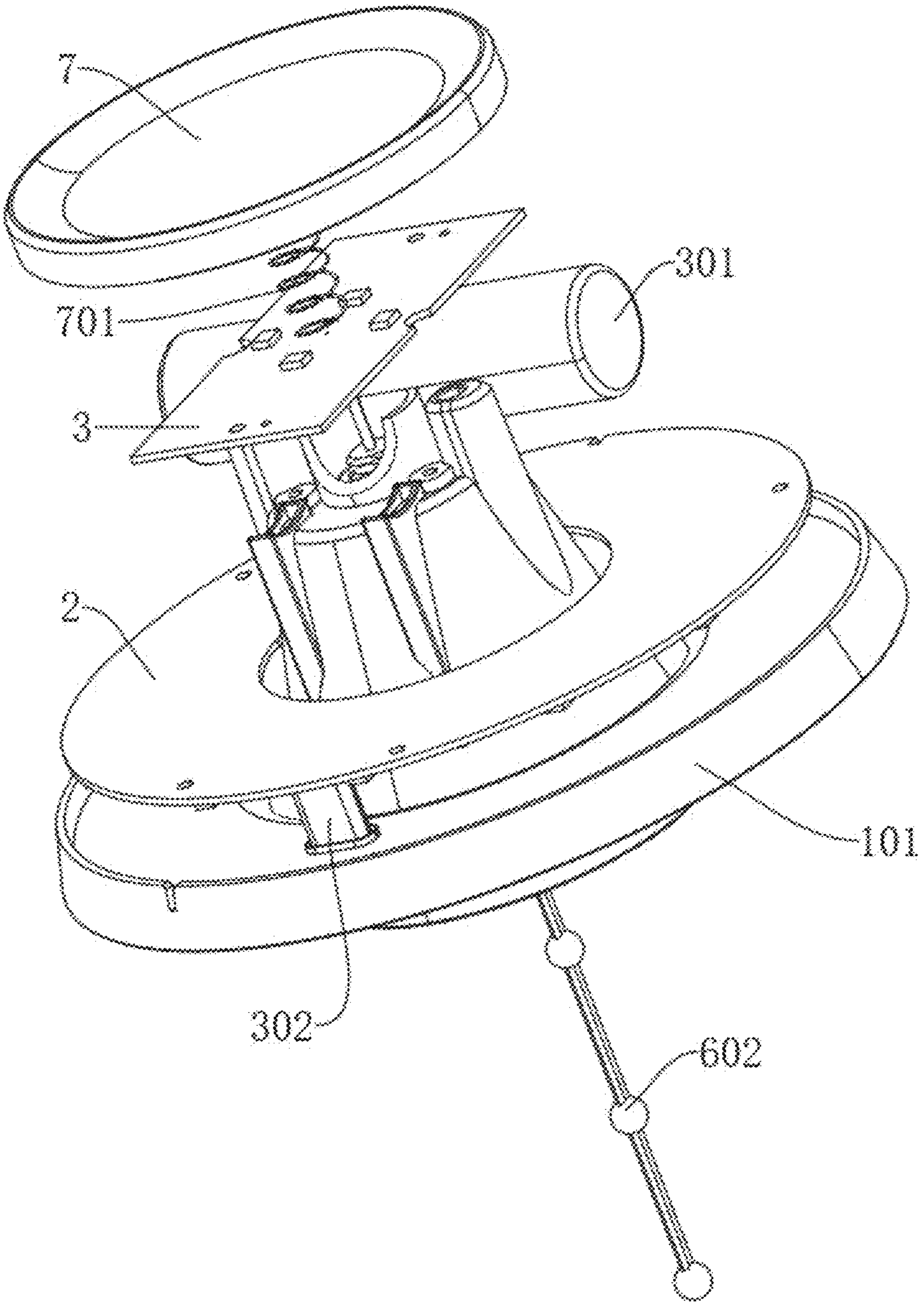
FIG. 3 is a second schematic structural diagram of the wine bottle lamp proposed by the present disclosure.

Referring to FIGS. 1-6, a wine bottle lamp includes a lampshade 1. A bottom of lampshade 1 is connected to a clamping sleeve 4 and an LED light string 602. The clamping sleeve 4 is made of soft rubber material; the clamping sleeve 4 is a concave cylindrical shape, which is fixedly connected to the bottom of the lampshade 1, as shown in FIG. 1. The clamping sleeve 4 can be clamped at a mouth of a beer bottle, that is, at the mouth of a wine bottle body 8. The LED light string 602 is located inside the clamping sleeve 4, and a bottom of the LED light string 602 extends out of the clamping sleeve 4. The bottom of the LED light string 602 is suspended, and there is a light bead on the LED light string 602.

When installing, the clamping sleeve 4 is simply placed on the bottle mouth of the beer bottle, as shown in FIG. 1, which is the wine bottle body 8. An inner wall of the clamping sleeve 4 is in contact with an outer wall of the beer bottle mouth. At this time, the LED light string 602 extends into an interior of the beer bottle, and the LED light string 602 is lit. The light source is emitted from the interior of the beer bottle, thereby integrating the beer bottle with the lamp and enhancing the artistic atmosphere of the wine bottle light.

Figure 5:
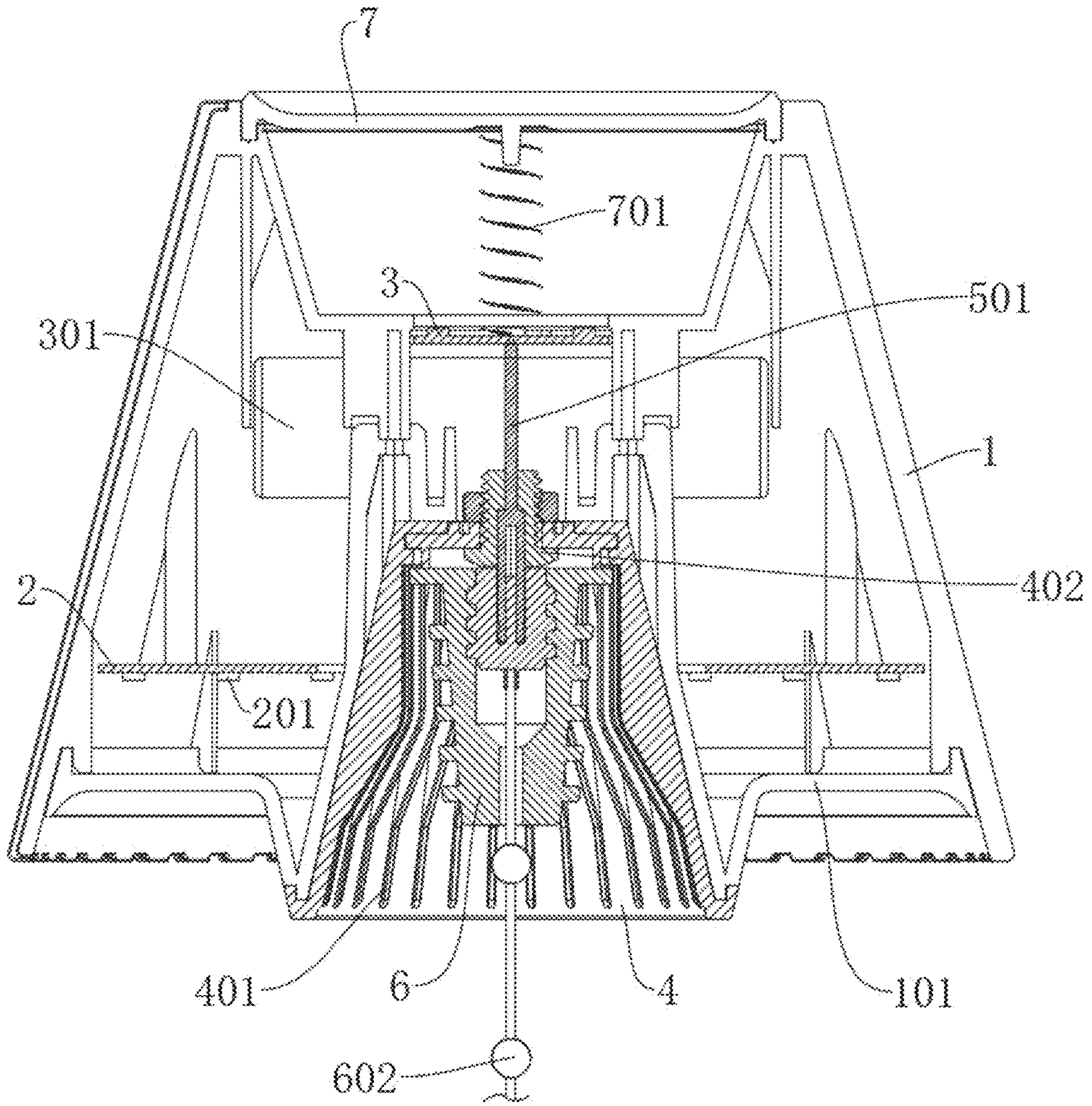
FIG. 5 is a sectional view of the wine bottle lamp proposed by the present disclosure.
Figure 6:
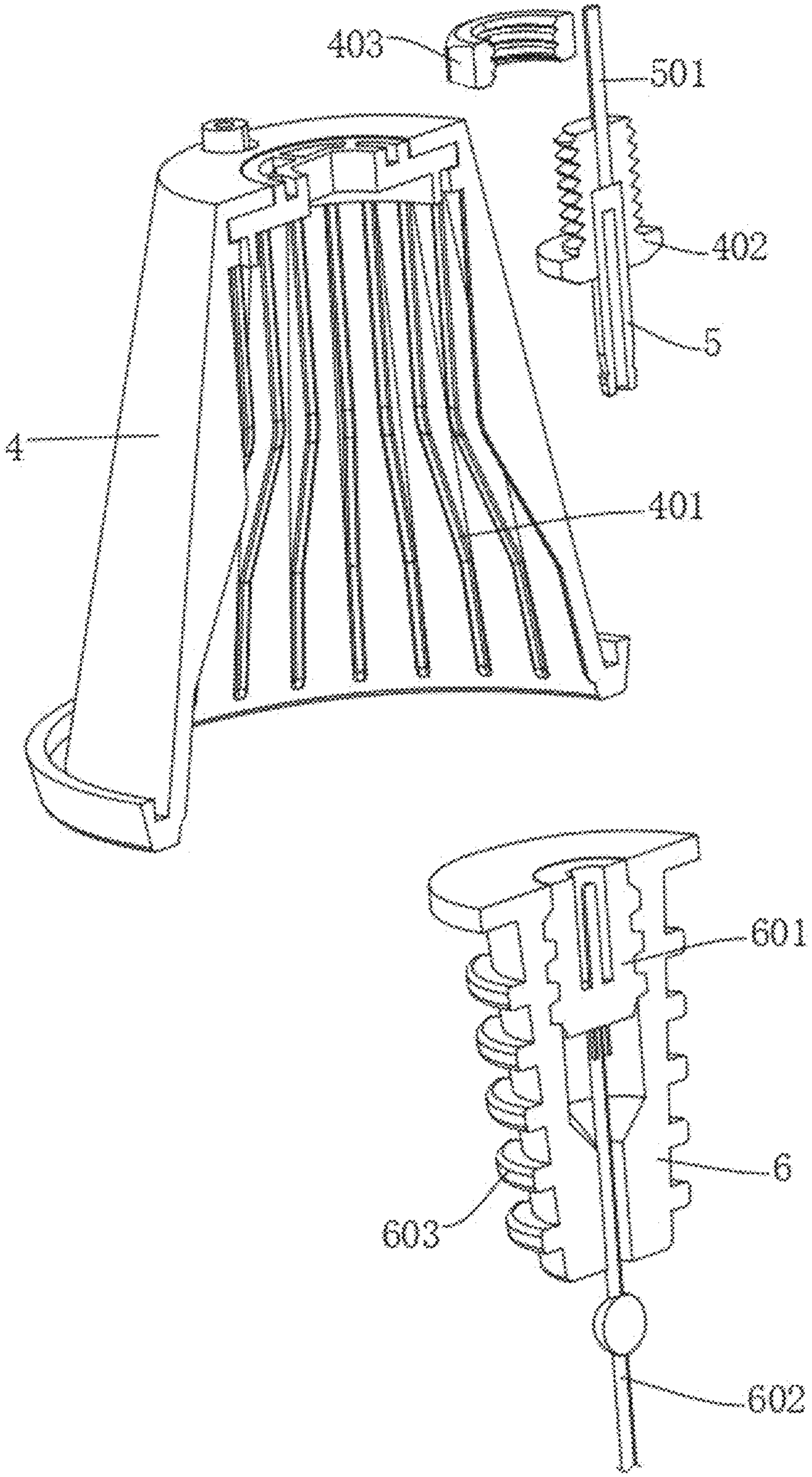
FIG. 6 is a schematic structural diagram of a clamping sleeve of the wine bottle lamp proposed by the present disclosure.

As shown in FIGS. 5 and 6, there is a male connector 5 connected inside the clamping sleeve 4. This embodiment discloses a wine bottle lamp, which further includes a complementary body 6. A top of the complementary 6 is fixedly connected with a female connector 601, and an LED light string 602 is fixedly connected with the complementary body 6; a top of the LED light string 602 is electrically connected to the female connector 601, and a bottom of the LED light string 602 extends out of the complementary body 6. The material of the complementary body 6 is the same as that of the clamping sleeve 4. The lampshade 1 is fixedly connected to a circuit board 3, and a top of the male connector 5 is electrically connected to the circuit board 3 through a wire 501.

The LED light string 602 is provided on the complementary body 6. During installation, only the female connector 601 on the complementary 6 needs to be docked with the male connector 5. Then, when it is plugged into the beer bottle, the clamping sleeve 4 will be attached to an outer wall of the beer bottle mouth, and the complementary body 6 will also be synchronously attached to an inner part of the beer bottle mouth, thereby improving friction and enhancing the stability of the connection with the beer bottle.

As shown in FIG. 6, the complementary body 6 is designed in a "T" shape, so that when a top of the complementary body 6 is in contact with a top of the beer bottle mouth, the complementary body 6 will not completely enter the interior of the beer bottle. When the lamp is removed from the beer bottle, if the friction between the complementary body 6 and the beer bottle mouth is too high, the female connector 601 and the male connector 5 will automatically separate, and then the complementary body 6 can be manually removed.

When the complementary body 6 is attached to the top of the beer bottle mouth, the deformation of the complementary body 6 can prevent the LED light string 602 from being excessively compressed.

As shown in FIGS. 5 and 6, this embodiment discloses a wine bottle lamp, which further includes a connection cylinder 402. The connection cylinder 402 is inserted into the clamping sleeve 4 and then fixed by a nut 403 for the purpose of easy installation. The male connector 5 is fixedly connected to the connection cylinder 402.

As shown in FIG. 6, there are a plurality of sets of second protruding strips 603 distributed around an outer wall circumference of the complementary body 6, with a number of 3-8 sets, and they are designed horizontally. The second protruding strips 603 are integrally formed with the complementary body 6 and made of the same material.

Figure 4:
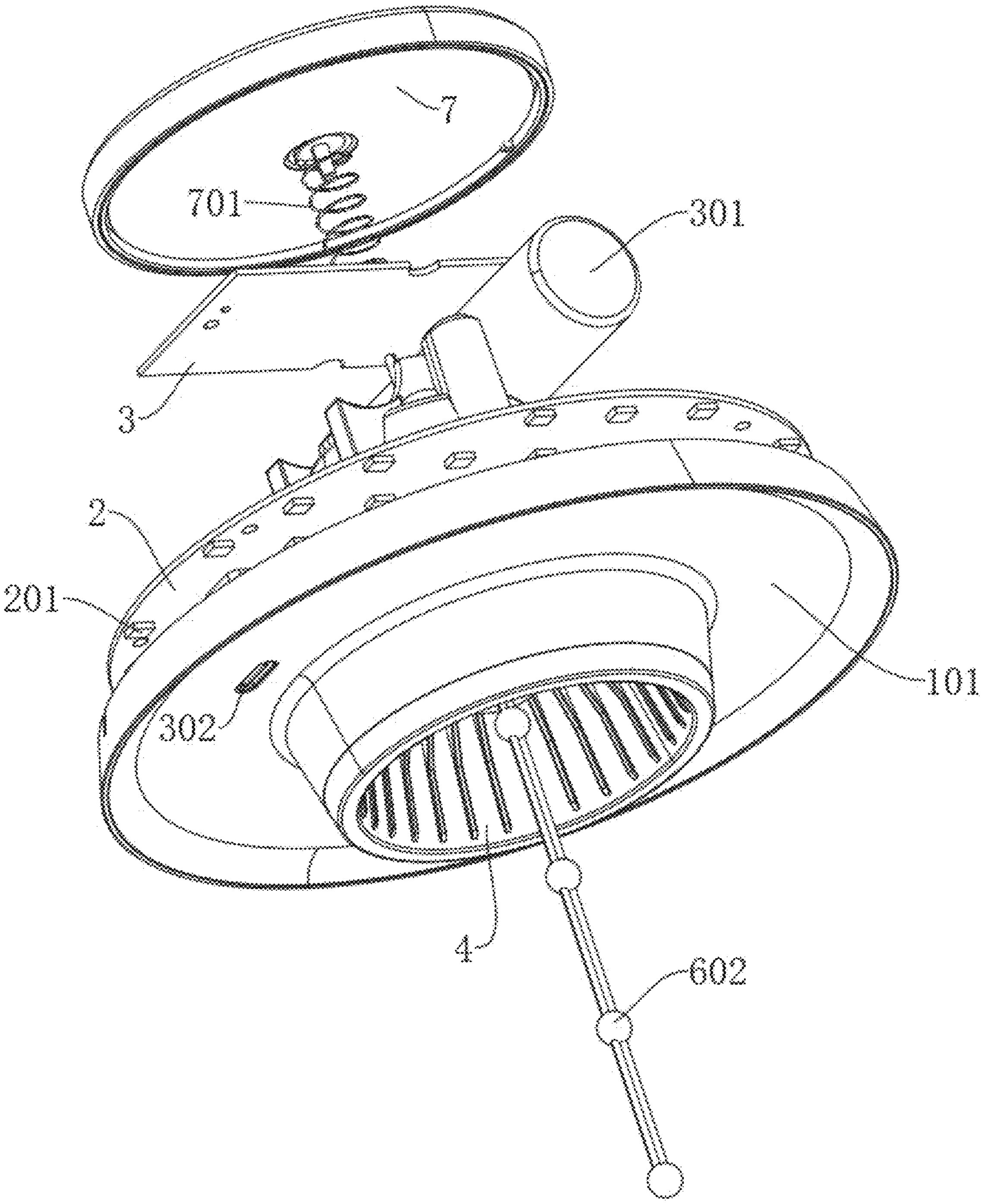
FIG. 4 is a third schematic structural diagram of the wine bottle lamp proposed by the present disclosure.

As shown in FIGS. 4-6, there are a plurality of sets of first protruding strips 401 distributed on an inner wall circumference of the clamping sleeve 4, with a total of 10-20 sets, and they are designed vertically. The first protruding strips 401 are integrally formed with the clamping sleeve 4 and made of the same material.

By using the first protruding strips 401 and the second protruding strips 603, the stability when fitting onto the beer bottle mouth is improved, thereby avoiding shaking.

As shown in FIGS. 2-5, the lampshade 1 is fixedly connected with a luminous plate 2, and the bottom of lampshade 1 is fixedly connected with a transparent plate 101. A side of the luminous plate 2 facing the transparent plate 101 is provided with a LED bead 201, and the luminous plate 2 is semi-transparent milky white, such as plastic.

When in use, while the LED light string 602 is lit, the luminous plate 2 is also lit synchronously. The emitted light passes through the transparent plate 101 and shines on the outer wall of the beer bottle, rendering it more artistic.

The lampshade 1 is fixedly connected with a battery 301 for providing power.

When the battery 301 runs out of power, it can be charged through a charging interface 302, or directly supplied to the luminous plate 2 and the LED light string 602. The transparent plate 101 is provided with the charging interface 302.

A top of the lampshade 1 is fixedly connected to a pressing plate 7, which is made of elastic and deformable plastic material. A spring 701 is installed at a bottom of the pressing plate 7, and a pressure-sensitive sensor is installed inside the lampshade 1, that is the pressure-sensitive sensor is located at a bottom of the spring 701.

By pressing the pressing plate 7, the pressing plate 7 deforms and compresses the spring 701, and then the pressure is transmitted to the pressure-sensitive sensor, which controls the switch.

The above is only preferred specific implementation of the present disclosure, but the protection scope of the present disclosure is not limited to this. Any technical personnel familiar with the technical field should be included in the protection scope of the present disclosure if they replace or change the technical solution and the concept of the present disclosure within the technical scope disclosed in the present disclosure.

What is claimed is:

1. A wine bottle lamp, comprising a lampshade, wherein a bottom of the lampshade is connected with a clamping sleeve and an LED light string;

the clamping sleeve is of concave cylindrical shape;

the LED light string is located inside the clamping sleeve, and a bottom of the LED light string extends out of the clamping sleeve;

wherein there are a plurality sets of first protruding strips distributed around an inner wall circumference of the clamping sleeve.

2. The wine bottle lamp according to claim 1, wherein the clamping sleeve is connected with a male connector inside;

wherein the wine bottle lamp further comprises a complementary body, a top of the complementary body is fixedly connected with a female connector, and the LED light string is fixedly connected with the complementary body;

a top of the LED light string is electrically connected to the female connector, and the bottom of the LED light string extends into the complementary body.

3. The wine bottle lamp according to claim 2, further comprising a connection cylinder, which is inserted into the clamping sleeve, and the connector is fixedly connected to the connection cylinder.

4. The wine bottle lamp according to claim 2, wherein there are a plurality sets of second protruding strips distributed around an outer wall circumference of the complementary body.

5. The wine bottle lamp according to claim 1, wherein the lampshade is fixedly connected with a luminous plate, and a bottom of the lampshade is fixedly connected with a transparent plate.

6. The wine bottle lamp according to claim 1, wherein a battery is fixedly connected an interior of the lampshade.

7. The wine bottle lamp according to claim 2, wherein the lampshade fixedly connected to a circuit board, and a top of the male connector is electrically connected to the circuit board through a wire.

8. The wine bottle lamp according to claim 5, wherein a charging interface is provided on the transparent plate.

9. The wine bottle lamp according to claim 1, wherein a pressing plate is fixedly connected to a top of the lampshade, and a spring is provided at a bottom of the pressing plate.

* * * * *